(12) United States Patent
Ognibene

(10) Patent No.: US 10,461,606 B2
(45) Date of Patent: Oct. 29, 2019

(54) LINEAR ELECTRIC ACTUATOR FOR STEERING SYSTEMS

(71) Applicant: OGNIBENE POWER S.P.A., Reggio Emilia (IT)

(72) Inventor: Claudio Ognibene, Reggio Emilia (IT)

(73) Assignee: OGNIBENE POWER S.P.A., Reggio Emilia (IT)

( * ) Notice: Subject to any disclaimer, the term of this patent is extended or adjusted under 35 U.S.C. 154(b) by 271 days.

(21) Appl. No.: 15/660,620

(22) Filed: Jul. 26, 2017

(65) Prior Publication Data

US 2018/0041094 A1 Feb. 8, 2018

(30) Foreign Application Priority Data

Aug. 3, 2016 (IT) .......................... 102016000081544

(51) Int. Cl.
| | |
|---|---|
| H02K 41/02 | (2006.01) |
| H02K 7/06 | (2006.01) |
| H02K 11/21 | (2016.01) |
| B62D 5/04 | (2006.01) |
| H02K 1/22 | (2006.01) |
| H02K 5/18 | (2006.01) |

(Continued)

(52) U.S. Cl.
CPC ............ *H02K 7/06* (2013.01); *B62D 5/0403* (2013.01); *B62D 5/0427* (2013.01); *B62D 5/0448* (2013.01); *F16H 25/24* (2013.01); *H02K 1/22* (2013.01); *H02K 5/18* (2013.01); *H02K 7/003* (2013.01); *H02K 11/01* (2016.01); *H02K 11/21* (2016.01); *F16H 25/2204* (2013.01); *F16H 2025/2078* (2013.01); *F16H 2025/249* (2013.01); *H02K 1/278* (2013.01); *H02K 5/02* (2013.01)

(58) Field of Classification Search
CPC ............ H02K 7/06; H02K 7/003; H02K 1/34; H02K 5/02; B62D 5/0403; B62D 5/0427; B62D 5/0448; F16H 25/24; F16H 25/2204; F16H 2025/2078
USPC ........................................ 310/13–15, 44–45
See application file for complete search history.

(56) References Cited

U.S. PATENT DOCUMENTS 4,712,027 A * 12/1987 Karidis .................... H02K 1/08
310/12.02
9,469,335 B2 * 10/2016 Sato .................... B62D 5/0415
(Continued)

FOREIGN PATENT DOCUMENTS

| EP | 2950428 A1 | 12/2015 |
|---|---|---|
| JP | 2003227567 A | 8/2003 |
| JP | 2015216737 A | 12/2015 |

OTHER PUBLICATIONS

European Search Report dated Jul. 31, 2017, in counterpart application EP 17180686.

*Primary Examiner* — Thanh Lam
(74) *Attorney, Agent, or Firm* — Volpe and Koenig, P.C.

(57) ABSTRACT

A linear electric actuator for steering systems includes: a casing, an electric motor, housed in the casing, which is provided with a stator and a hollow rotor internally concentric to the stator, a holder nut internally fixed to the rotor, and a stem having a thread coupled to the holder nut. The stem includes a first portion provided with a surface treatment, which projects outside the casing, and a second portion without said surface treatment, which is contained inside the casing and in which the thread is obtained.

15 Claims, 6 Drawing Sheets

(51) Int. Cl.
*H02K 7/00* (2006.01)
*H02K 11/01* (2016.01)
*F16H 25/24* (2006.01)
H02K 1/27 (2006.01)
H02K 5/02 (2006.01)
F16H 25/22 (2006.01)
F16H 25/20 (2006.01)

(56) References Cited

U.S. PATENT DOCUMENTS

2015/0330497 A1* 11/2015 Amano ................ H02K 7/06
74/89.41
2018/0251150 A1* 9/2018 Ognibene ............ B62D 5/0427

* cited by examiner

LINEAR ELECTRIC ACTUATOR FOR STEERING SYSTEMS

TECHNICAL FIELD

A linear electric actuator, in particular a linear electric actuator for steering systems.

BACKGROUND

As known, linear electric actuators for activating vehicle steering systems comprise a stem, whose ends are associated to the wheels of the vehicle by means of leverages.

Translating said stem towards one or the other wheel enables steering the vehicle by inclining the wheels with respect to the direction of advancement in one direction or the other.

A known solution provides for that the translation of the stem be carried out through a recirculating ball screw system.

In particular, an external thread obtained in a portion of the stem is coupled, by interposing balls, to a holder nut and the translation of the stem is carried out by driving the holder nut in rotation by means of an electric motor.

This screw-holder nut coupling is generally contained in a hermetically closed casing suitable to contain a lubricating fluid, while the ends of the stem project outside so as to be connected to the leverages of the steering.

Thus, these ends are exposed to direct contact with the external bodies, dirt and, in given applications, with the atmospheric agents.

The stem should be made of material capable of guaranteeing a rather high surface hardness so as avoid wear due to external agents.

At the same time, the stem should also be made of a material that can guarantee the machinability features required to obtain an external thread with the right tolerances (very stringent in case of recirculating ball screw systems).

In addition, were we also to consider the fact that the stem should be made in a single piece in order to guarantee suitable static structural resistance and stress strength, it is clear how generally challenging it is to simultaneously meet all the aforementioned needs.

An object of the present invention is to overcome this drawback of the prior art through a solution that is simple, rational and inexpensive.

These objects are attained by the characteristics of the invention, which are outlined in the independent claims.

The dependent claims outline preferred and/or particularly advantageous aspects of the invention.

SUMMARY

The invention provides a linear electric actuator for steering systems comprising: a casing, an electric motor, housed in the casing, which is provided with a stator and a hollow rotor internally concentric to the stator, a holder nut internally fixed to the rotor, and a stem having a thread coupled to the holder nut, wherein the stem comprises a first portion provided with a surface treatment, which projects outside the casing, and a second portion without said surface treatment, which is contained inside the casing and in which said thread is obtained.

This solution enables providing a linear electric actuation for steering systems, wherein the stem may be constituted by a single body and comprises at least one end projecting from the casing with high resistance against external agents and a thread that can be easily obtained with the required tolerances.

In particular, the surface treatment may be a treatment with addition of material.

In this manner, even in case of highly abrasive external agents and or prolonged wear, the initial diameter of the stem, and thus the structural resistance thereof, remains intact.

For example, the surface treatment may be a chrome-plating treatment.

This enables protecting the end of the stem against wear through a method that is inexpensive and easy to implement.

According to a further aspect of the invention, the surface treatment is a thermochemical conversion treatment.

This enables obtaining a stem provided with an outer surface that is highly resistant and easy to obtain.

According to another aspect of the invention, the casing may comprise a head provided with a cylindrical opening wherein there is slidably inserted and from which there projects part of the first portion of the stem.

This solution allows preventing external bodies and dirt from finding their way into casing.

For example, the head may be made of steel, in particular high resistance steel possibly subjected to nitriding treatment.

This advantageously enables increasing mechanical resistance of the casing as well as its resistance to wear.

According to a further aspect of the invention, the actuator may comprise a casing interposed between the opening and stem.

This enables obtaining the head made of a less expensive material with respect to the material the bushing is made of, which is designated to provide resistance to friction wear.

According to another aspect of the invention, the stem may comprise a third portion provided with a surface treatment, which projects outside the casing on the side opposite to the first portion.

This solution allows obtaining an actuator which allows controlling both steering wheels of the vehicle by means of only one device.

According to a further aspect of the invention, the casing may comprise a tubular portion, wherein there is inserted the electric motor, made of aluminium.

This prevents the generation of parasitic current inside the casing.

According to another aspect of the invention, the casing may comprise a plurality of cooling fins.

This allows increasing the useful life of the actuation.

According to another aspect of the invention, the thread is coupled to the holder nut by interposing a plurality of balls.

This solution allows reducing the wear of the components, the noisiness of the mechanism and the power of the engine absorbed by friction.

According to another aspect of the invention, the stem may comprise a cavity suitable to recirculate the balls.

This enables obtaining a system for recirculating balls inside the stem, thus guaranteeing high compactness of the solution and no interference with the engine geometries.

According to a further aspect of the invention, the actuator may comprise an angular sensor.

This allows obtaining an actuator with an accurate control system.

According to another aspect of the invention, the actuator may comprise a linear sensor.

This solution allows verifying the actual displacement of the stem and the direction of such displacement.

The invention also provides a vehicle provided with steering wheels and comprising the previously outlined actuator for steering said wheels.

BRIEF DESCRIPTION OF THE DRAWINGS

Further characteristics and advantages of the invention will be apparent from reading the following description—provided by way of non-limiting example—with reference to the figures illustrated in the attached drawings.

DETAILED DESCRIPTION OF THE PREFERRED EMBODIMENTS

With particular reference to such figures, a linear electric actuator for vehicle steering systems was indicated in its entirety with 10.

The actuator 10 comprises a casing 20 provided with a tubular portion 25, which for example may have a rectangular cross-section and be made of an aluminum extrusion.

Figure 6:
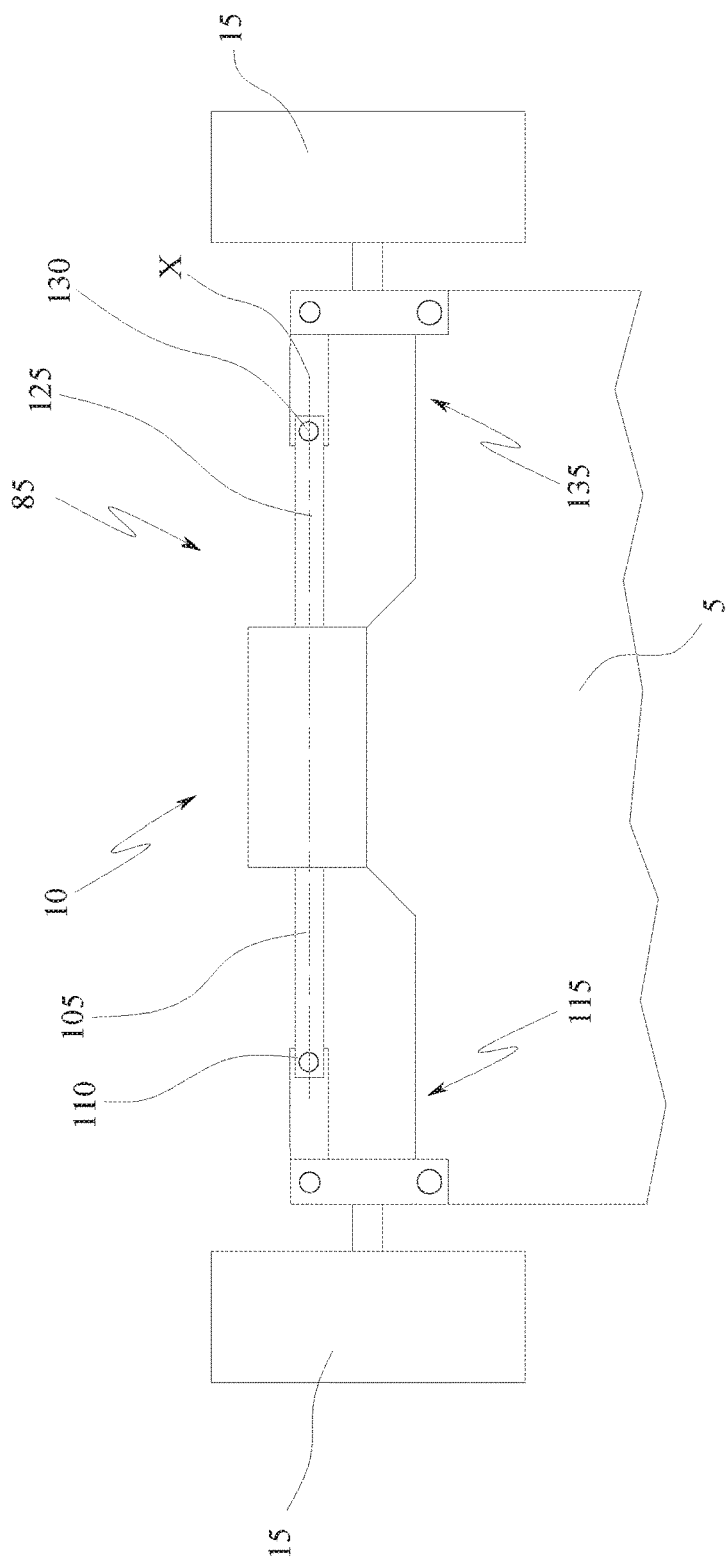
FIG. 6 is a diagram of a steering system comprising an actuator according to the invention.

The tubular portion 25 is designed to be fixed to a framework 5 of a vehicle provided with a pair of steering wheels 15 (see FIG. 6).

The casing 20 also comprises a first head 30 and a second head 35 suitable to close the open ends of the tubular portion 25.

The first head 30 and the second head 35 are fixed to the tubular portion 25 by means of threaded members, for example by means of four screws.

The first head 30 comprises a cylindrical opening 40 having a central axis X parallel to the longitudinal axis of the tubular portion 25.

The second head 35 comprises a cylindrical opening 45 having a central axis coinciding with the central axis X of the cylindrical opening 40.

The diameter of the cylindrical opening 40 is substantially equivalent to the diameter of the cylindrical opening 45.

The first head 30 and the second head 35 may be made of high resistance steel, for example provided with a hardening surface treatment carried out on the entire surface of the head 30, 35.

Such hardening surface treatment may for example be a nitriding surface treatment.

In an alternative embodiment, the first head 30 and the second head 35 each comprise a bushing (not illustrated in the figures) housed in the respective cylindrical opening 40, 45 and having a central axis coinciding with the central axis X.

Each bushing may for example be made of a high resistance steel provided with a hardening surface treatment.

Even in this case, the surface treatment the bushing is provided with may be a nitriding surface treatment.

In this second embodiment provided with bushings, the heads 30 and 35 may not be provided with a hardening surface treatment.

The casing 20 may also comprise a plurality of cooling fins (not represented in the drawings) arranged on the outer surface.

Figure 1:
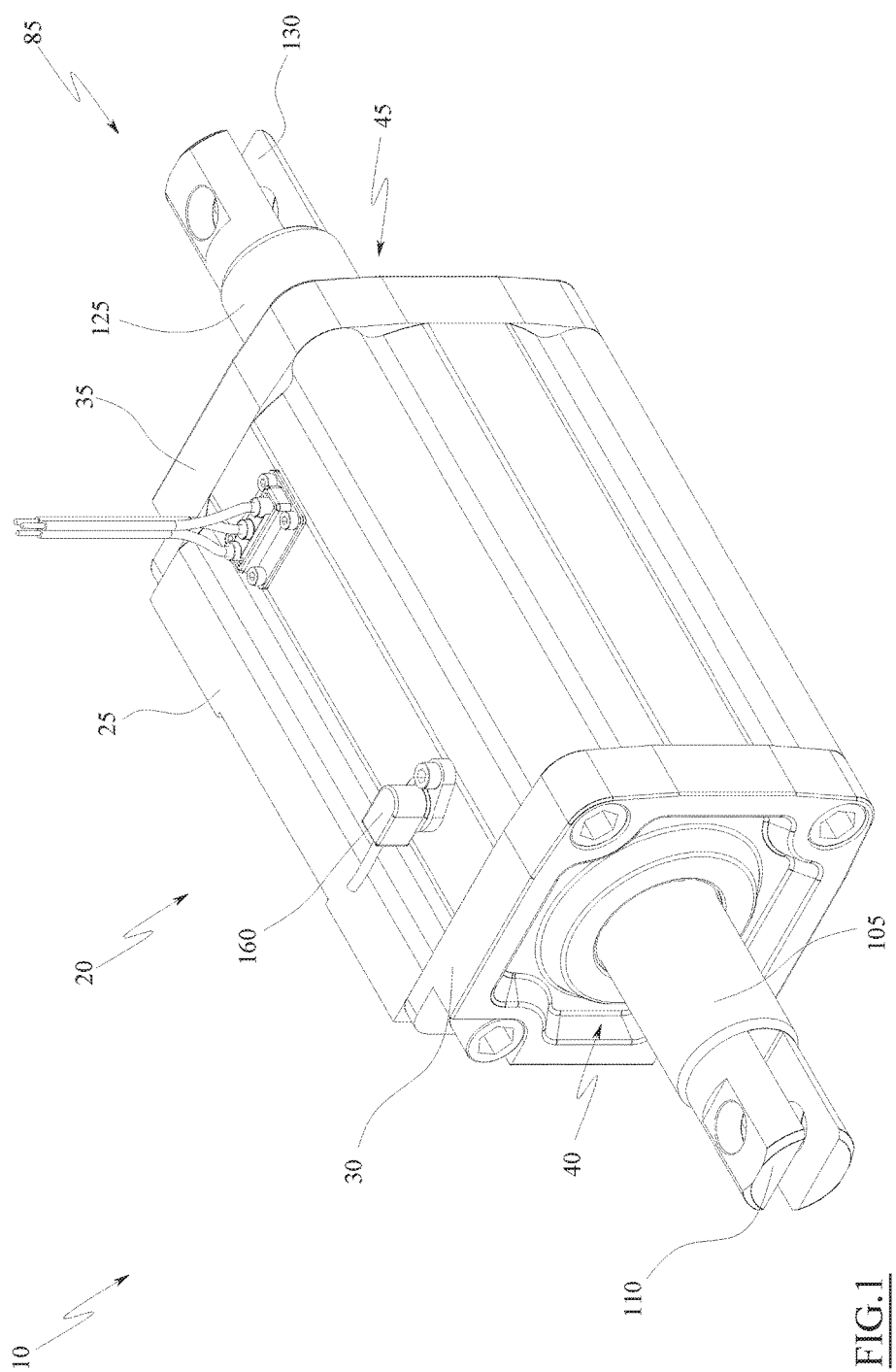
FIG. 1 is a perspective view of the actuator according to the invention.
Figure 2:
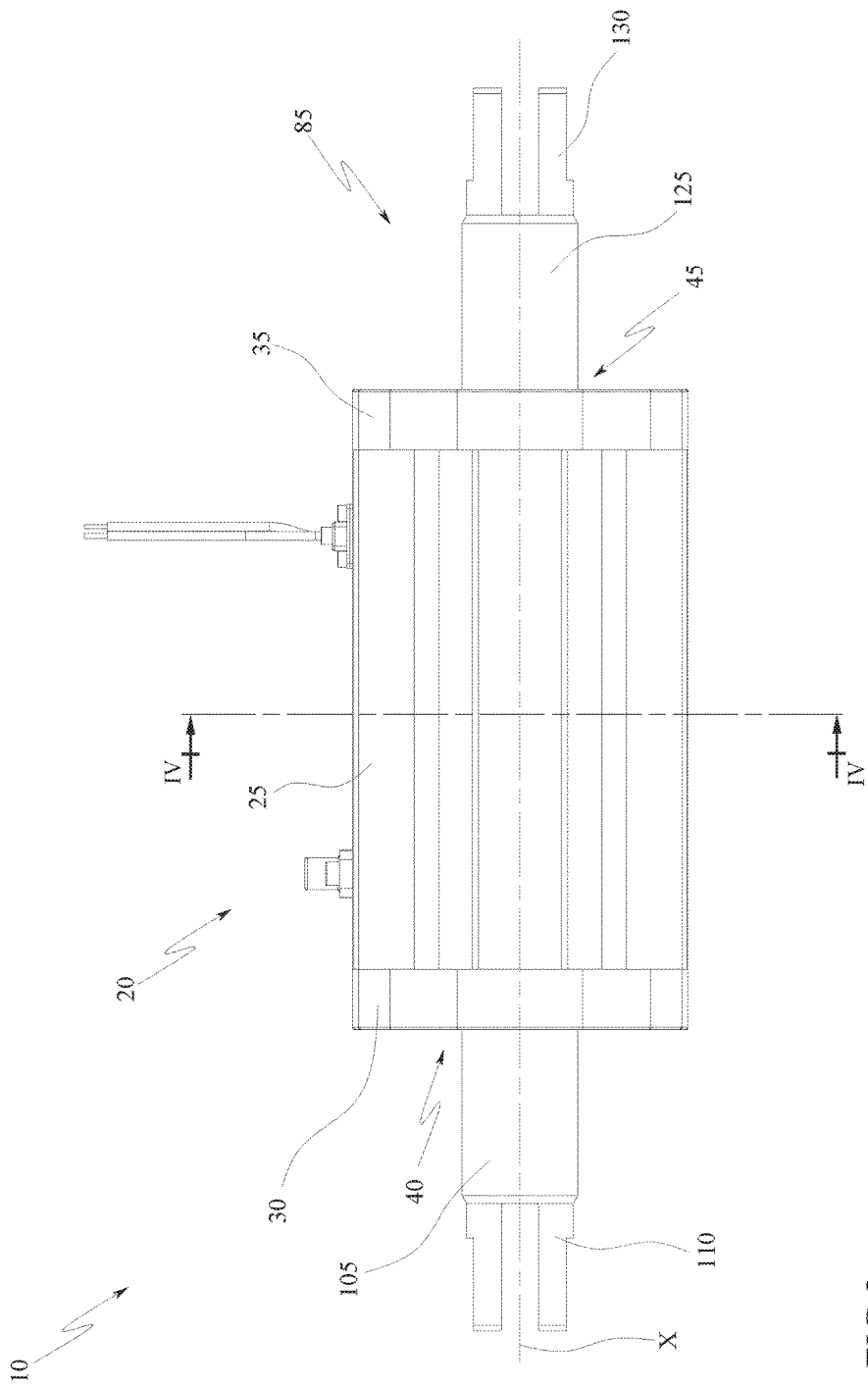
FIG. 2 is a front view of the actuator of FIG. 1.
Figure 3:
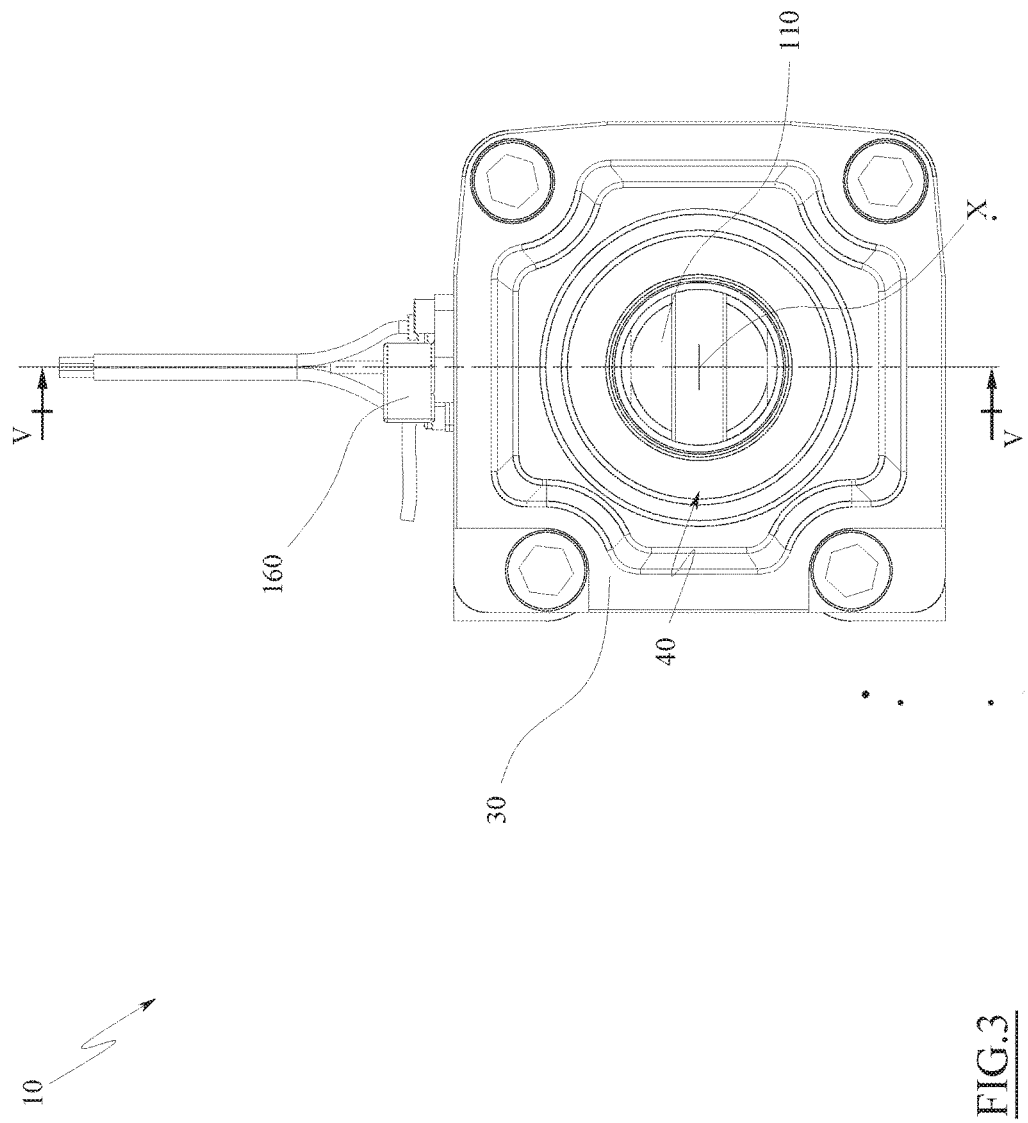
FIG. 3 is a lateral view of the actuator of FIG. 1.
Figure 4:
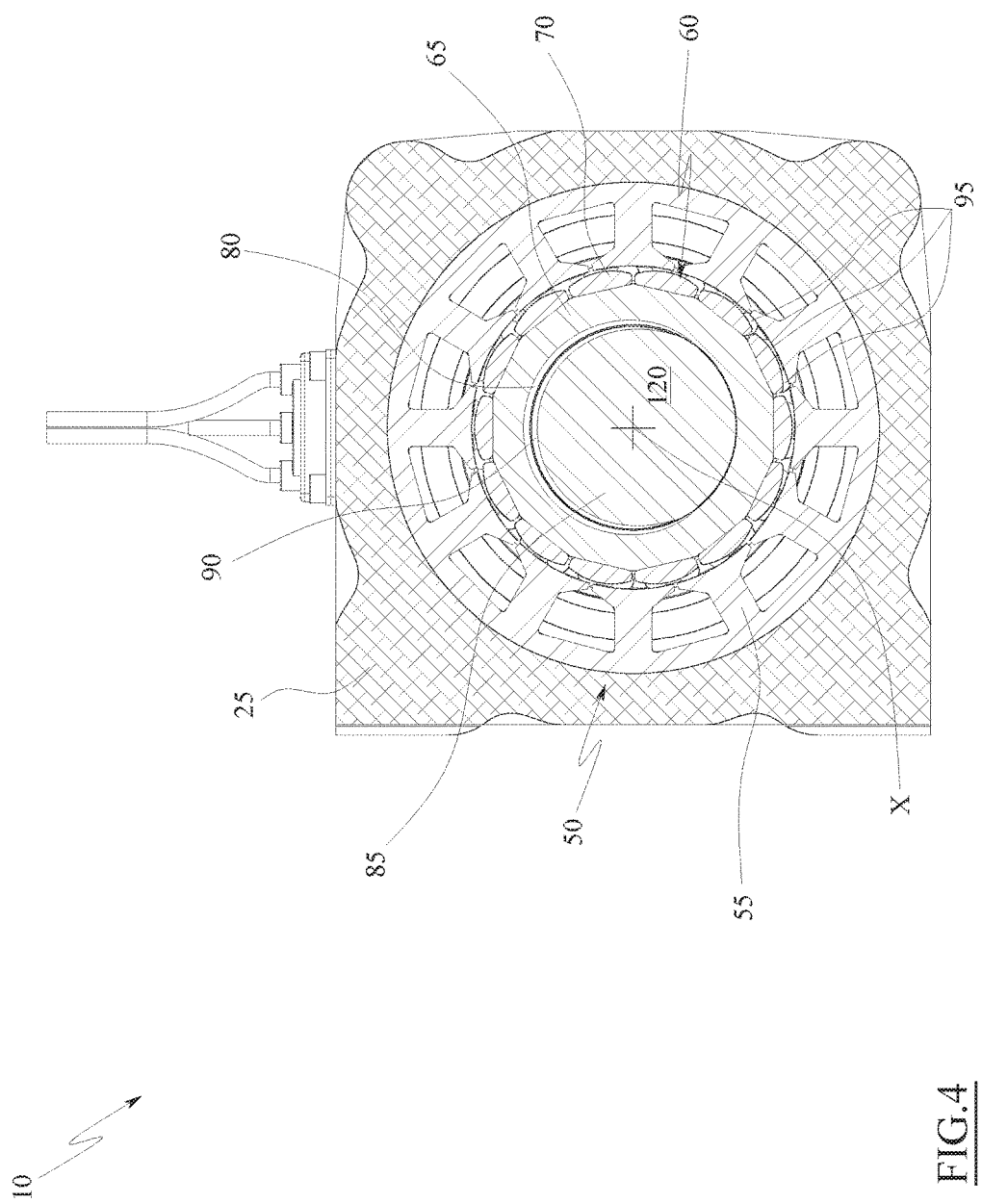
FIG. 4 is a sectional view of the actuator of FIG. 2 according to plane IV-IV.
Figure 5:
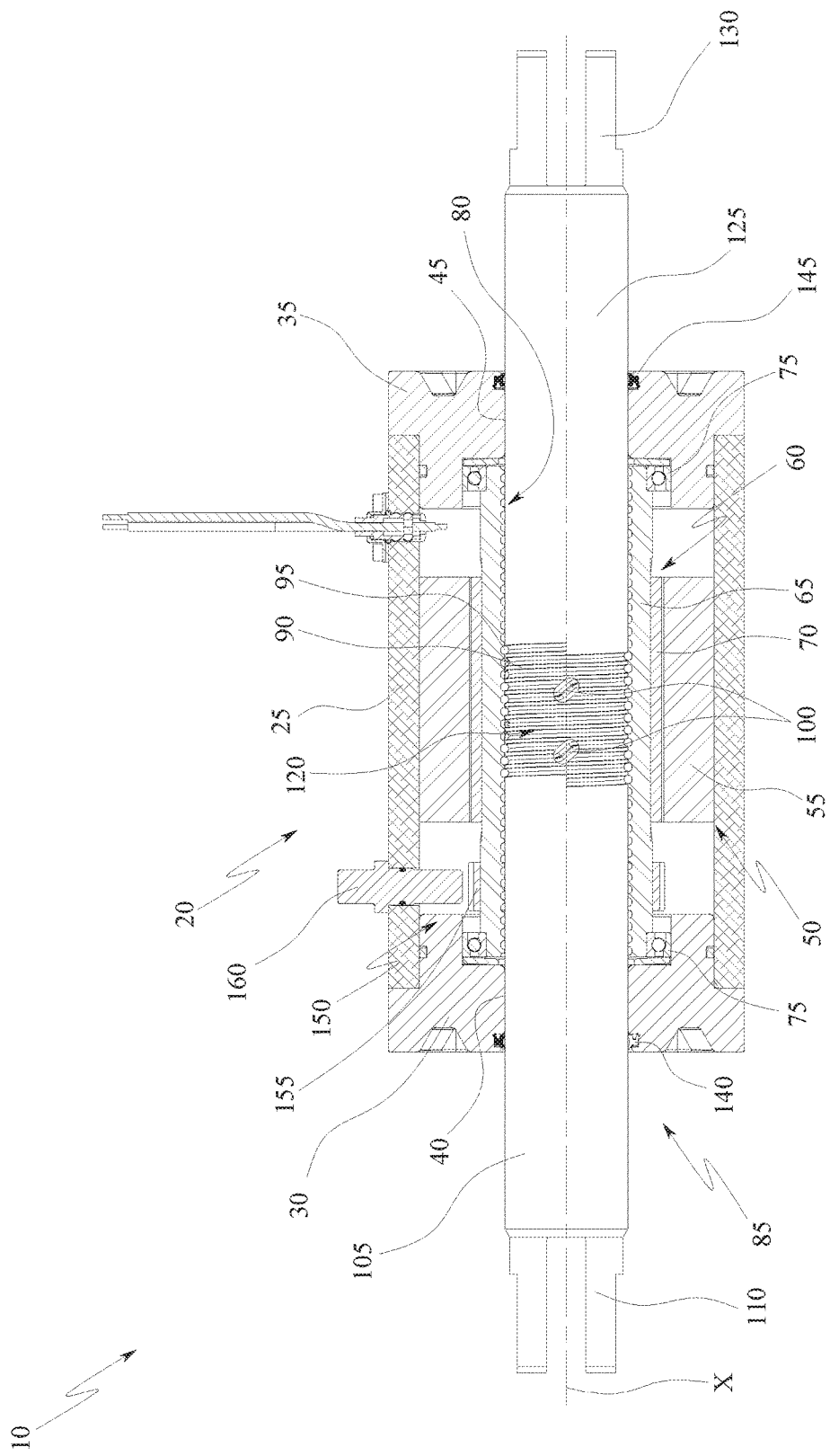
FIG. 5 is a sectional view of the actuator in FIG. 3 according to plane V-V.

The actuator 10 comprises an electric motor 50, observable in FIGS. 4 and 5, housed in the casing 20.

The electric motor 50 is for example of the synchronous three-phase type.

The electric motor 50 comprises a stator 55 fixed to the tubular portion 25 of the casing 20.

The stator 55 comprises, as known to a man skilled in the art, a structure provided with a plurality of packaged strips around which there are wound the coils connected to the power supply of the electric motor 50.

The motor 50 comprises a rotor 60 internally concentric to the stator 55 and rotatably associated to the casing 20 with respect to a rotation axis coinciding with the central axis X.

The rotor 60 is provided with a cylindrical body 65 and a plurality of permanent magnets 70 arranged on the outer surface, i.e. facing towards the stator 55, of the cylindrical body 65.

The permanent magnets 70 may for example be fixed to the cylindrical body 65 using glues.

The cylindrical body 65 is rotatably associated to the casing through a pair of bearings 75, each one of which is housed in a suitable seat obtained in the respective head 30, 35.

The cylindrical body 65 may for example be made of high resistance steel.

The actuator 10 comprises a holder nut 80, intended as an internal thread, which is obtained inside the cylindrical body 65 and it has a screw axis coinciding with the central axis X.

The holder nut 80 extends along the entire axial dimension of the cylindrical body 65.

The actuator 10 further comprises a stem 85 slidably associated to the casing 20 with respect to a sliding axis coinciding with the central axis X.

The stem 85 comprises a thread 90, which is coupled to the holder nut 80 by interposing a plurality of balls 95, and a series of cavities 100 obtained in a portion of the stem 85 at the thread 90 and suitable to recirculate said balls 95.

In other words, the thread 90 and the holder nut 80 are configured so as to obtain a recirculating ball screw with a recirculation system inside the portion that serves as a screw, i.e. the stem 85.

The thread 90 has a much smaller axial extension with respect to the axial extension of the holder nut 80.

The stem 85 comprises a first portion 105, which is provided with a surface treatment and is slidably inserted in the cylindrical opening 40 of the first head 30, so as to project from said first head 30 towards the external of the casing 20.

The first portion 105 comprises a fork element 110, through which the first portion 105 is integrally joined to a first steering leverage 115, observable in FIG. 6, of one of the two steering wheels 15.

Back to FIG. 5, the stem 85 comprises a second portion 120, which is not treated on the surface and in which the thread 90 is obtained.

The second portion 120 is always inside the casing 20 in any operating condition.

The stem 85 also comprises a third portion 125 provided with a surface treatment and projecting outside the casing 20 through the cylindrical opening 45 of the second head 35.

The third portion 125 comprises a fork element 130, through which the third portion 125 is integrally joined to a second steering leverage 135, observable in FIG. 6, of one of the two steering wheels 15.

The surface treatment of the first and/or of the third portion 125 may for example be a treatment with addition of material, in particular a chrome-plating treatment with electrolytic deposition or plasma deposition or thermochemical treatment with subsequent oxidation.

Alternatively, the surface treatment with addition of material may be a ceramic layer application treatment, for example by plasma or thermochemical deposition with subsequent oxidation.

A further option provides for that the surface treatment be a thermochemical conversion treatment.

The thread 90 may for example be obtained in a step subsequent to the complete surface treatment on the entire stem 85, for example by removing material, thus even removing the surface treatment from the second portion 120.

The first portion 105, second portion 120 and third portion 125 form the single body of the stem 85, which for example may be made of high resistance steel.

The actuator 10 comprises a first sealing 140, housed in a suitable seat obtained in a portion of the cylindrical opening 40 of the first head 30, which is suitable to surround a part of the jacket of the first portion 105 of the stem 85.

A second actuator 145 is housed in a suitable seat obtained in a portion of the cylindrical opening 45 of the second head 35 and it is suitable to surround a part of the jacket of the third portion 125 of the stem.

The first sealing 140 and the second sealing 145 may for example be sliding lip sealings.

The actuator 10 comprises an angular sensor 150 for example provided with a phonic wheel 155 fixed to the cylindrical body 65 and a sensor 160 suitable to read the phonic wheel 155 and housed in a seat obtained in the tubular portion 25 of the casing 20.

The actuator 10 may also comprise a linear encoder (not illustrated in the drawings) suitable to provide information regarding the axial position of the stem 85 along the central axis X.

Lastly, the actuator 10, i.e. the casing, is at least partly filled with a lubricating fluid.

The actuator 10 according to the invention operates as follows.

When the electric motor 50 is actuated, the holder nut 80 is driven in rotation around the central axis X and, given that the stem 85 cannot rotate due to the fact that it is hinged to the steering wheels 15, the rotary motion of the holder nut 80 is transformed into a translational motion of the stem 85 along the central axis X.

In the translational motion thereof, the stem 85 pushes one of the two leverages while it pulls the opposite one, thus inclining the steering wheels 15 with respect to the direction of advancement of the vehicle.

During the steering operation a verification of the correct operation of the actuation may be carried out by means of the angular encoder 150 and linear encoder.

The use of aluminum for obtaining the tubular portion 25 enables avoiding the generation of parasitic currents in the casing 20 and thanks to the nitriding treatment carried out on the heads 30 and 35, the bending of the step 85 in use will not cause wear or deformation of the cylindrical openings 40 and 45.

The invention thus conceived is susceptible to numerous modifications and variants all falling within the inventive concept.

In addition, all details can be replaced by other technically equivalent elements.

Basically, the materials used as well as the shapes and contingent dimensions, may vary according to the needs without departing from the scope of protection of the claims that follow.

The invention claimed is:

1. A linear electrical actuator (10) for steering systems comprising:
    a casing (20),
    an electric motor (50), housed in the casing (20), which is provided with a stator (55) and a hollow rotor (60) internally concentric to the stator (55),
    a holder nut (80) internally fixed to the rotor (60), and
    a stem (85) having a thread (90) coupled to the holder nut (80), the stem (85) comprising a first portion (105) provided with a surface treatment, which projects outside the casing (20), and a second portion (120) without said surface treatment, which is contained inside the casing (20) and in which said thread (90) is obtained.

2. The actuator (10) according to claim 1, wherein the surface treatment is a treatment with addition of material.

3. The actuator (10) according to claim 2, wherein the surface treatment with addition of material, is a chrome-plating treatment.

4. The actuator (10) according to claim 1, wherein the surface treatment is a thermochemical conversion treatment.

5. The actuator (10) according to claim 1, wherein the casing (20) comprises a head (30) provided with a cylindrical opening (40) wherein there is slidably inserted and from which there projects part of the first portion (105) of the stem (85).

6. The actuator (10) according to claim 5, wherein the head (30) is made of steel.

7. The actuator (10) according to claim 6, further comprising a bushing interposed between the cylindrical opening (40) and the stem (85).

8. The actuator (10) according to claim 1, wherein the stem (85) comprises a third portion (125) provided with a surface treatment, which projects outside the casing (20) on the side opposite to the first portion (105).

9. The actuator (10) according to claim 1, wherein the casing (20) comprises a tubular portion (25), wherein there is inserted the electric motor (50), made of aluminum.

10. The actuator (10) according to claim 1, wherein the casing (20) comprises a plurality of cooling fins.

11. The actuator (10) according to claim 1, wherein the thread (90) is coupled to the holder nut (80) by interposing a plurality of balls (95).

12. The actuator (10) according to claim 10, wherein the stem (85) comprises a plurality of cavities (100) adapted to recirculate the balls (95).

13. The actuator (10) according to claim 1, further comprising an angular sensor (150).

14. The actuator (10) according to claim 1, further comprising a linear sensor.

15. A vehicle provided with steering wheels (15) comprising an actuator (10) according to claim 1, configured to steer said wheels.

* * * * *